July 23, 1940.  A. H. B. JEFFORDS ET AL  2,208,584
BUSHING INSERTER
Filed June 13, 1935  6 Sheets-Sheet 1

INVENTOR.
ALEXANDER H. B. JEFFORDS
HENRY P. CAMP
BY
Kurs Hudson & Kent
ATTORNEYS

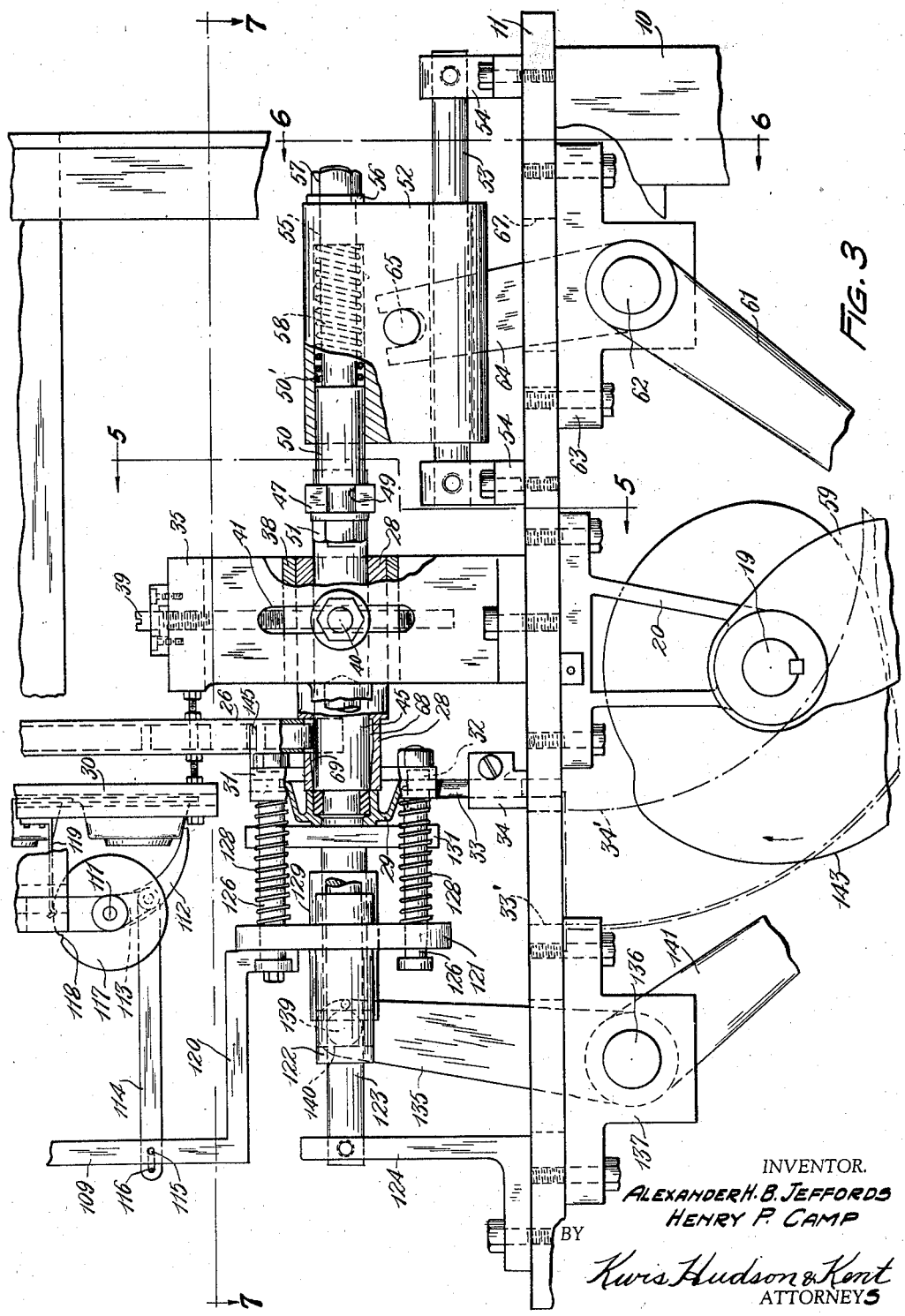

July 23, 1940.    A. H. B. JEFFORDS ET AL    2,208,584
BUSHING INSERTER
Filed June 13, 1935    6 Sheets-Sheet 5
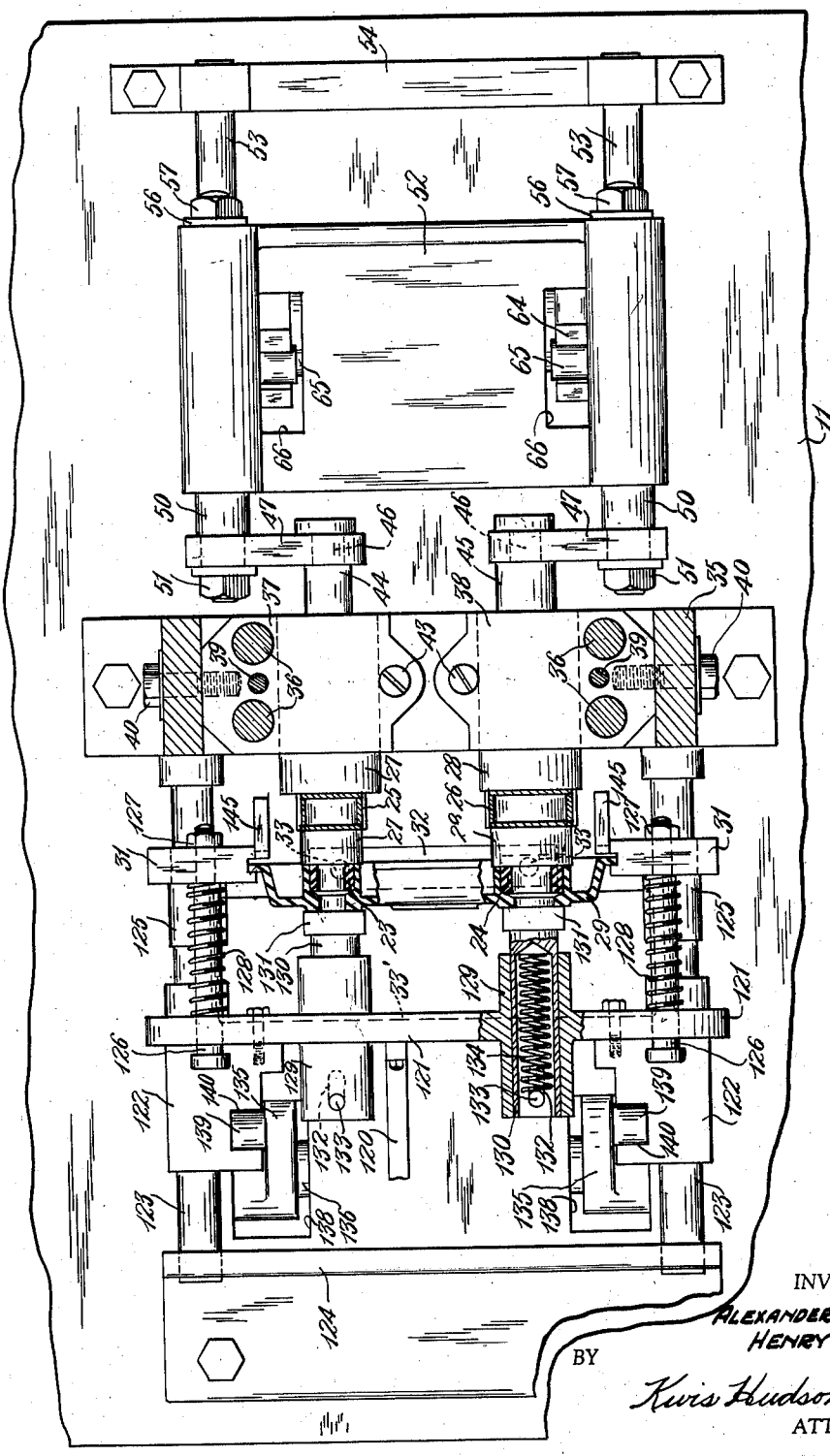
INVENTOR.
ALEXANDER H. B. JEFFORDS
HENRY P. CAMP
BY
Kwis Hudson & Kent
ATTORNEYS

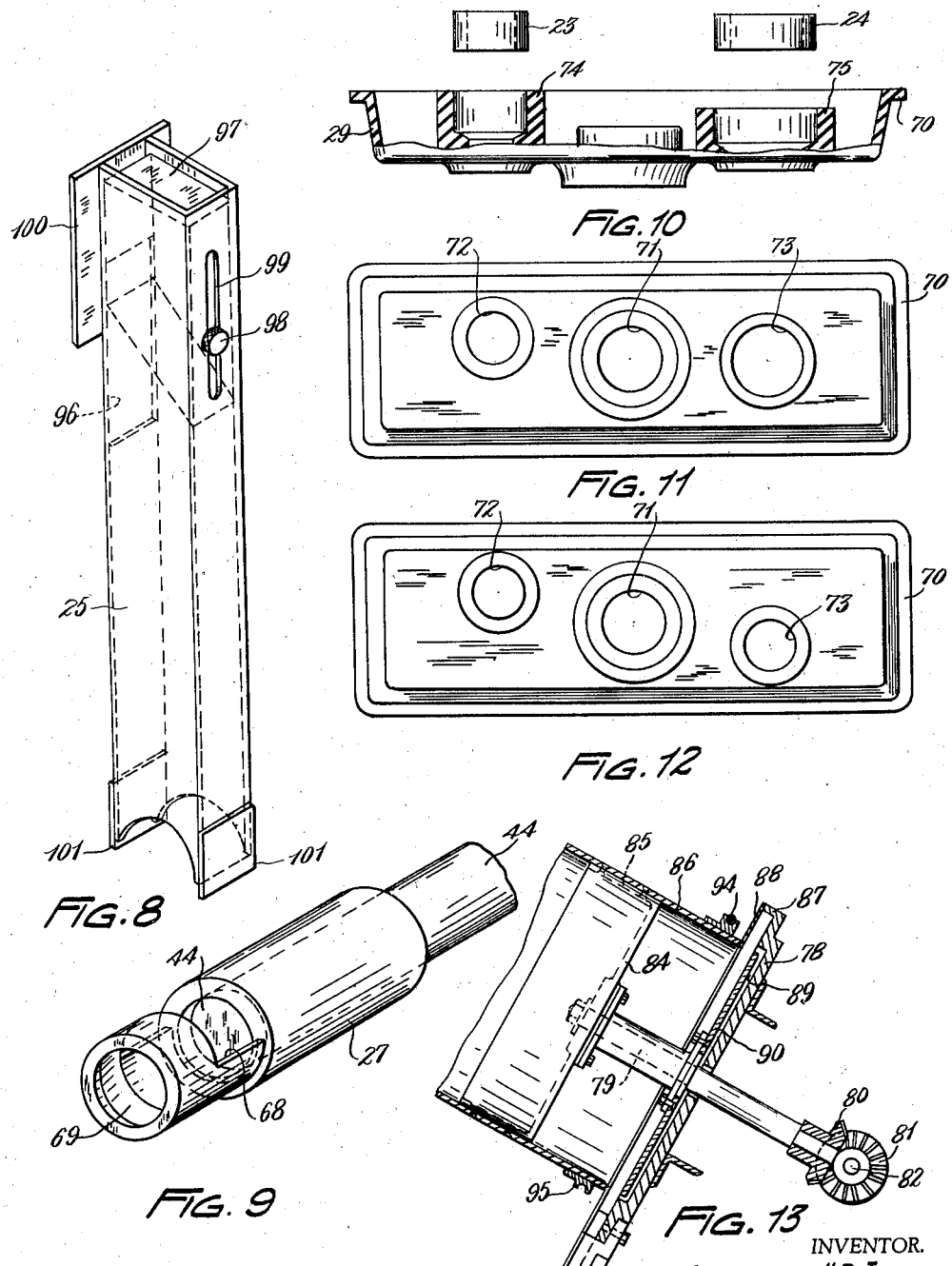

UNITED STATES PATENT OFFICE 2,208,584

BUSHING INSERTER

Alexander H. B. Jeffords, East Cleveland, and Henry P. Camp, Lakewood, Ohio, assignors to Willard Storage Battery Company, Cleveland, Ohio, a corporation of West Virginia Application June 13, 1935, Serial No. 26,440

15 Claims. (Cl. 136—1)

This invention relates to improvements in bushing inserters, that is to say it relates to a machine for inserting bushings in covers for storage batteries. These bushings are generally made of soft rubber and they serve to seal the joints between the covers and the terminal posts of each cell where those posts project upwardly through the covers. The fit between the bushings and the sockets formed in the covers to receive them is fairly close, requiring some compression of the bushings in many instances. This work of inserting bushings in storage battery covers has been performed heretofore by hand at considerable expense.

The principal object of the present invention is the provision of a machine for performing the stated operation more expeditiously and at lower cost than it has heretofore been performed by hand.

A further object is the provision in connection with the pushing of the bushings into place in the cover sockets of means for compressing the bushings radially inward.

Another object is the provision of feeding means for delivering the two bushings into position for being operated upon by the pushers, this means comprising adjustments to accommodate the machine to covers in which the socket centers are offset from the center line of the cover more or less.

Another object is the provision of means for delivering the covers one at a time into a predetermined position in the machine for the reception of the bushings, together with means for discharging the covers after the bushings have been inserted, each cover when it is permitted to fall into position being separated from the column or stack of covers above it, so that the weight of the column will not be transmitted to the falling cover and hence will not tend to break it.

Still another object of the invention is the provision of a novel hopper feed for the bushings.

Other objects and features of novelty will appear as we proceed with the description of that embodiment of the invention which, for the purposes of the present application, we have illustrated in the accompanying drawings, in which Fig. 1 is an end elevation of a machine embodying the invention.

Fig. 3 is an end elevation on a larger scale, with certain parts shown in section, disclosing the principal working elements of the machine and showing a cover in position immediately after the insertion of a bushing.

Fig. 7 is a plan view, partly in section on the line 7—7 of Fig. 3.

Figs. 8 and 9 are perspective views showing a chute for bushings, a bushing guide and a plunger working therein.

Fig. 10 is a longitudinal sectional view of a battery cell cover in inverted position, with the bushings that go into the sockets surrounding the post openings.

Figs. 11 and 12 are top plan views of two cell covers designed for an end cell and a middle cell, respectively, of a storage battery.

Fig. 13 is a fragmental sectional view of one of the bushing hoppers.

Figures 1, 4:
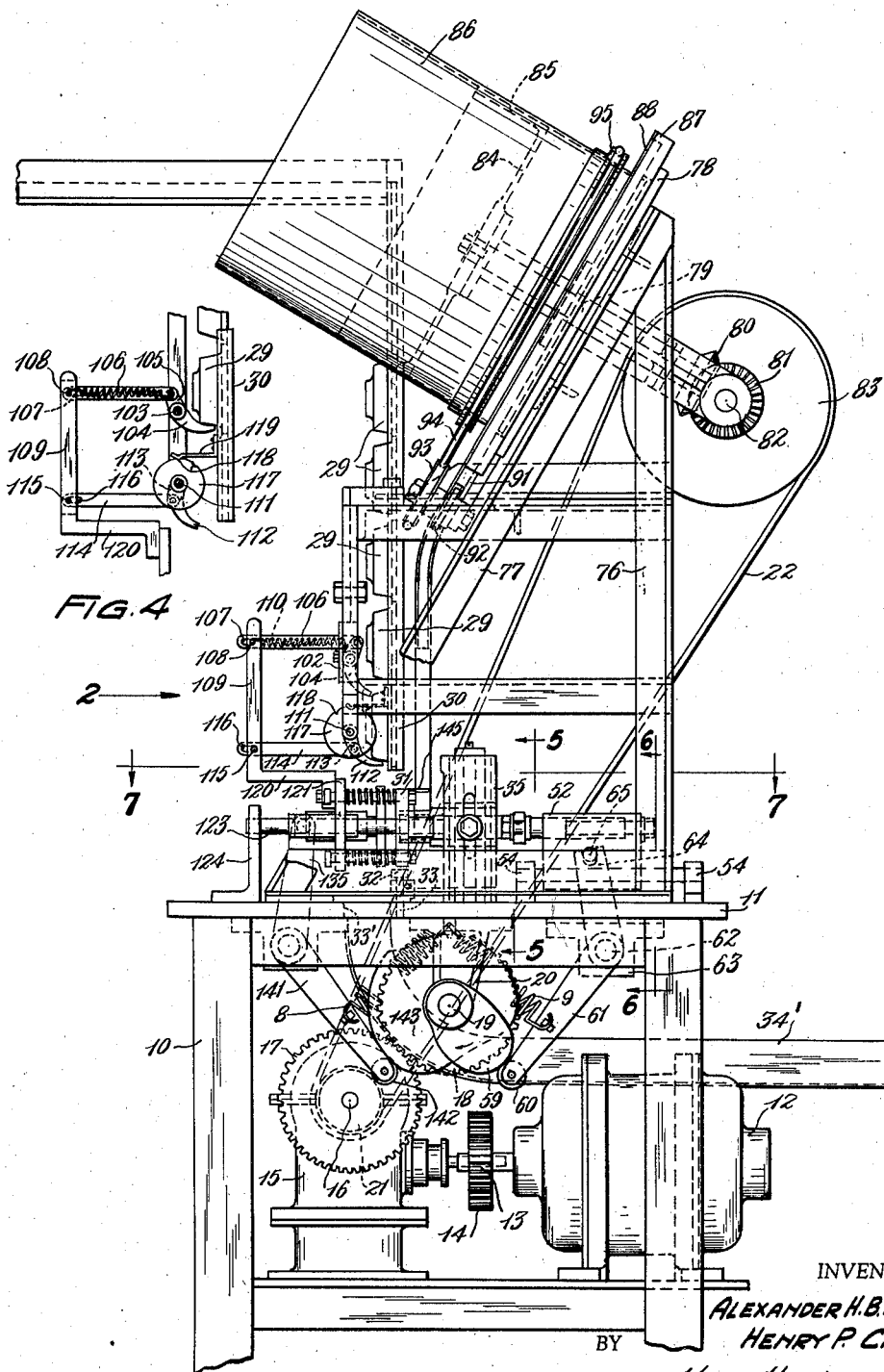
Fig. 4 is a fragmental elevational view of an escapement mechanism used in connection with the cover feed, this view showing the parts in a position different from that of Fig. 1.

In the drawings we have shown an underframe 10 with a top 11. Beneath the top 11 we mount a motor 12 which operates through a pair of gears 13 and 14 to drive a conventional speed reduction unit 15. The low speed shaft 16 of the latter carries a gear 17 which meshes with another gear 18 on the cam shaft 19 of the machine, the latter being journaled in bearing brackets 20 depending from the top 11 of the underframe. On the opposite end of shaft 16 there is a pulley 21 which drives a belt 22 by means of which the hoppers are actuated, as will presently appear.

The bushings, examples of which are illustrated at 23 and 24 in the drawings, are fed downwardly through chutes 25 and 26 respectively, the lower ends of the chutes being open and fitted to bushing guides or sleeves 27 and 28 in order that bushings may descend one at a time by gravity and enter the bushing guides. The covers, indicated at 29 in the drawings, are carried in a vertical chute made up of two vertical bars 30 spaced apart and provided with grooves on their facing edges of sufficient size to admit the bottom flanges of the covers.

Below the lower end of the cover chute there is what in effect is a continuation of the chute, consisting primarily of two bars 31 with their facing surfaces grooved to receive the flanges of the covers. These bars 31 and their supporting elements will be herein termed the cover holder. When a cover is in place on edge in this holder, its longitudinal dimension extending horizontally, the lower rim or flange of the cover rests on a small table 32 that is secured to the upper ends of two supporting pins 33, the latter being adjustably mounted in brackets 34 carried by the top 11 of the underframe. The table 32 may be adjusted therefore to bring it to the most desirable elevation for covers of different widths.

When a cover is deposited in the holder, the latter is preferably advanced slightly, and then the bushings in the two guides 27 and 28, which have been adjusted to bring them into alignment with the bushing sockets in the cover, are pushed into the cover sockets, after which the cover holder is retracted, moving over the surface of table 32 until the flange of the cover is drawn backwardly beyond the rear edge of the table, when the cover falls by gravity through an elongated hole 33' in the frame top 11 and into a container, chute or conveyor, as may be preferred. In the present instance we have indicated a chute 34' for this purpose.

Describing now more particularly the means for pushing bushings into the cover, it will be observed by reference especially to Figs. 3, 5, 6 and 7, that there is a transversely extending frame 35 secured to the top 11 of the underframe. Near each end of this frame 35 there are fixedly mounted two vertical guide rods 36. Two slide blocks 37 and 38 are provided with bores fitting the rods 36, which therefore constitute guides for these blocks. The blocks are adjustable up and down by means of adjusting screws 39. They may be securely fastened in adjusted position by means of two studs 40 which are threaded into the blocks and extend outwardly through slots 41 in the outer vertical members of the frame 35, the heads of these studs being adapted to bear against the said side members.

The guide sleeve 27 is mounted in block 37, while the guide sleeve 28 is similarly mounted in block 38. These guide sleeves are locked in position by means of suitably shaped clamping pieces 42, which are drawn up into clamping relation by means of screws 43.

Plungers 44 and 45 are adapted to slide in the guide sleeves 27 and 28 respectively. At their rear ends these plungers have reduced diameter portions 46 forming annular grooves. The plungers 44 and 45 take their driving force from two plates 47 which are provided with slots 48 extending upwardly from their lower ends and receiving the reduced diameter portions 46 of the plungers. The outer extremity of each of these plates is also provided with a slot 49 which receives a reduced end portion of each of two cylindrical rods 50. These reduced end portions are also threaded for the reception of nuts 51, by means of which the plates are held on the rods against movement longitudinally of the latter.

Each of the rods 50 is mounted in a bore 50' (Fig. 3), these bores being formed in upstanding side walls of a slide 52 which is mounted for reciprocation upon a pair of guide rods 53, the latter being mounted at their ends in brackets 54 secured to the top 11 of the underframe. The rods 50 are reduced in diameter throughout a considerable portion of their length, and the rear end of such reduced portion in each rod extends through a bore 55 of smaller diameter than bore 50', but centered with respect thereto. The rearwardly projecting ends of the rods 50 are threaded, and upon them are mounted washers and nuts 56 and 57 respectively to limit the forward movement of rods 50 with respect to the slide 52. A coil spring 58 surrounds the reduced diameter portion of each rod 50 that lies within bore 50', and this spring tends to hold the rod 50 advanced as far as the nut 57 will permit. This spring is strong enough to take without flexing the normal pressure required to insert a bushing. Should something occur to prevent the insertion of the bushing however, as for instance where a bushing was deformed or entered the sleeve incorrectly, the spring 58 would yield and prevent the breakage of the cover.

The slide 52 is reciprocated by means of a cam 59 on one end of cam shaft 19. Over the perimeter of cam 59 there runs a cam follower 60 which is rotatably mounted in the lower end of a lever 61 which is secured to a shaft 62 that is mounted in brackets 63 depending from the top 11 of the underframe. A tension spring 9 attached to lever 61 holds the follower 60 against the cam 59. On this shaft 62 there are fixed two arms 64 which are bifurcated at their upper ends to receive pins 65 that project inwardly from the side walls of the slide 52. Slots 66 are formed in the bottom walls of the slide 52 to accommodate the arms 64, and slots 67 are formed in the top 11 of the underframe for a similar purpose. (See particularly Figs. 6 and 7.)

The bore in the rear portion of each of the guide sleeves 27 and 28 has a good sliding fit with plungers 44 and 45 respectively, but where the chutes 25 and 26 join these guide sleeves their bores are increased in diameter, as indicated at 68 in Figs. 3 and 9. From this enlarged diameter portion the bore of the guide sleeve then tapers forwardly, as indicated at 69. Consequently, when the plunger is retracted a bushing may fall down into the enlarged bore portion 68. Then when the plunger advances it pushes the bushing forwardly through the tapered part 69 of the bore, thereby compressing the bushing radially and centering it for insertion into the cover socket.

Battery cell covers of the type upon which the present machine is adapted to operate are illustrated in Figs. 10, 11 and 12. Each cover has a bottom flange 70, extending entirely around its four sides, which rests upon a ledge or other supporting means formed on the battery jar. Near the center of the cover there is a vent opening 71, with which we are not here concerned. In the case of the cover for an end cell, such as is illustrated in Fig. 11, there are post openings 72 and 73 on either side of the vent opening. These openings are usually of different sizes, it being the practice to employ for the terminals of the battery posts which are larger in diameter than those used for connecting adjoining cells together. 73 is a terminal post opening and 72 is an intermediate post opening. While the terminal post openings are usually centered crosswise of the cover, the openings 72 are frequently positioned closer to one side than the other in order that the length of the connectors between cells may be reduced to a minimum. In the case of the cover for the middle cell, an example of which is illustrated in Fig. 12, there are two intermediate post openings 72, both of which may be positioned off the center line of the cover. By making our guide sleeves 27 and 28 vertically adjustable we are enabled to meet the requirements for various positions of the post hole openings. Should there be a variation in the spacing of the post hole centers longitudinally of the cover, this may be taken care of by substituting a different frame 35.

On the undersurface of the cover and surrounding the post openings there are formed annular bosses 74 and 75 which contain the bushing sockets, the latter being slightly smaller in diameter than the normal external diameter of the bushings 23 and 24 in order that the latter when inserted in the sockets will not be readily dislodged while the covers are being handled prior to or during their assembly in the batteries.

We will now describe somewhat in detail the means which we employ for feeding the bushings down into the guide sleeves. The hoppers for the bushings are supported upon an upper frame 76 which is carried upon and attached to the top 11 of the underframe, this upper frame being built largely of angle bars and other structural steel parts. The upper frame includes diagonal bars 77 upon which are supported plates 78. Through these plates there are projected shafts 79 which are rotatably mounted in suitable bearings in the frame, and have bevel gears 80 keyed to their lower extremities. These gears mesh with other bevel gears 81 that are keyed to a shaft 82 mounted in bearings in the frame. On one outer end of this shaft there is a pulley 83 over which runs the belt 22. The pulley 83 being larger than the pulley 21, shaft 82 is driven at a speed lower than that of shaft 16.

Secured to the upper end of each of shafts 79 there is a spider 84 having a cylindrical rim 85 which supports a cylinder 86. These cylinders are open at both ends. The plate 78 has an outer flange 87 which extends around its periphery except for a space at the lower end. A relatively thin annular cover plate 88 is secured to the top of the flange 87 and extends inwardly as far as the cylinder 86. See Fig. 13. This cover plate is preferably perforated in order that the operator may observe the bushings underneath it. The space beneath the plate 88 is sufficient to accommodate the thickness of the bushings which are to be handled, but in a single layer only. The central part of the plate 78 is recessed, as indicated at 89, to accommodate a bottom plate 90 of the hopper that is attached to shaft 79 and therefore rotates with that shaft and with the cylinder 86. The cylinder 86 and bottom plate 90 therefor, although connected only by the shaft 79, together constitute the hopper container, providing a peripheral opening at the bottom large enough to permit bushings which have arranged themselves flatwise to pass out of the hopper into the annular space below cover plate 88.

The flange 87 is omitted along a lower edge of each plate 78, and at that point there is attached to the plate the upper flared end of a chute 91 that has sufficient depth or thickness to accommodate one layer only of bushings. In each of these chutes there is an octagonal agitator 92 mounted on the lower end of a short shaft which projects upwardly or outwardly through the chute, where it carries a pulley 93 which is driven by a belt 94 that runs over a grooved ring 95 surrounding and attached to the cylinder 86. The agitators 92 are so positioned that they serve to prevent any jamming of the bushings at the point where they leave the flared part of the chute.

The upper parts 91 of the bushing chutes are permanent, but the lower parts 25 and 26 are removable and are changed whenever the size of bushings to be handled therein is changed, because the bushings must be fed down in a single vertical row. The removable and replaceable lower parts 25 and 26 of the chutes are preferably made of a transparent material, such as Celluloid, in order that the operator may observe the condition of the bushings within the chute. Near their upper ends these lower chutes each have an opening 96 through which the bushings may enter one at a time from the permanent upper chutes. A block 97 closes the chute at its upper extremity, this block being preferably adjusted as to height and being held in the desired adjustment by a screw 98 threaded into the block and extending through a slot 99 in a wall of the chute. 100 is a plate by means of which the removable chute is adjustably attached to the permanent chute. 101 are small plates which extend downwardly from the chute on either side of the guide sleeve to keep these parts in their proper relative positions.

Figure 2:
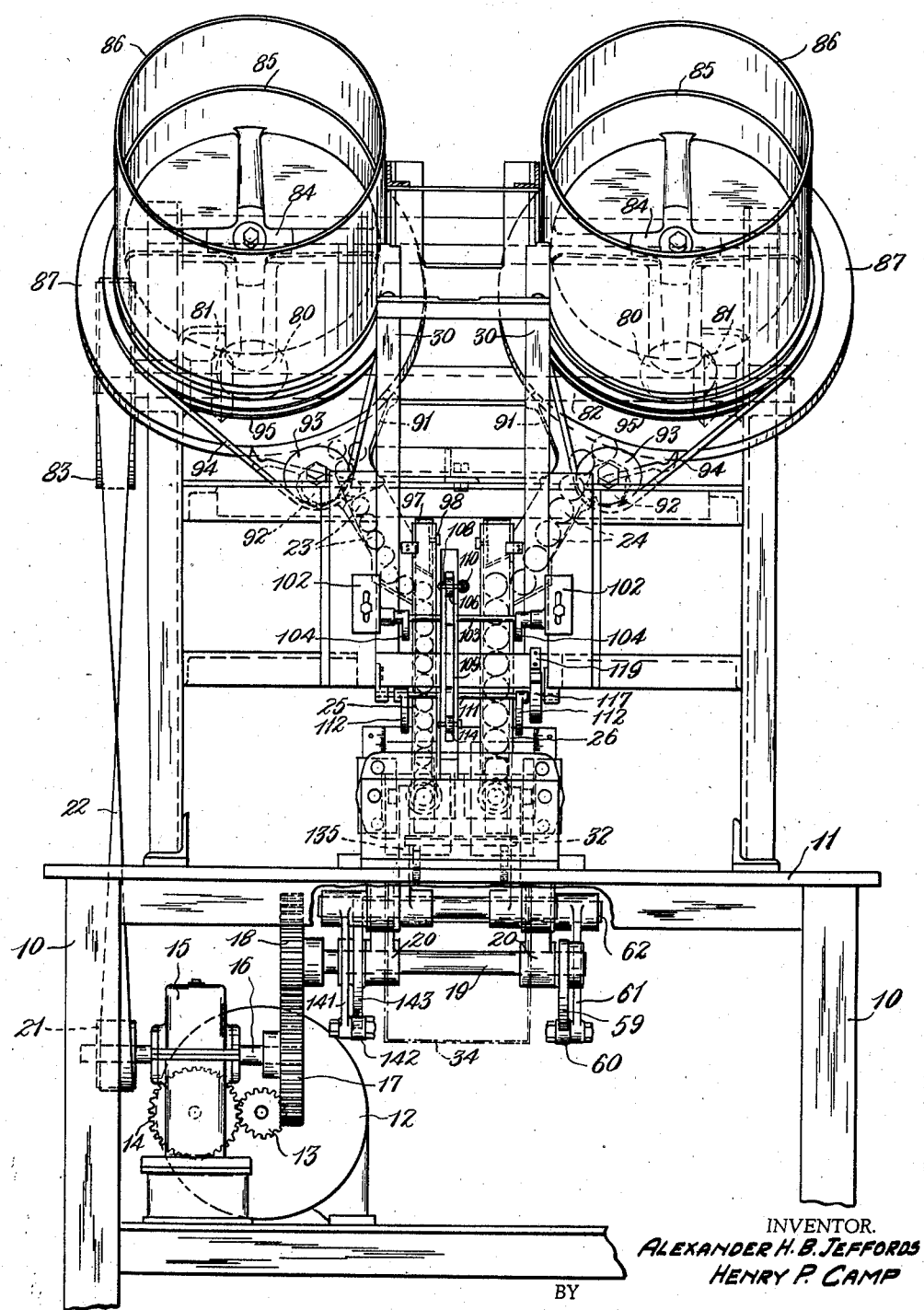
Fig. 2 is a side elevation of the same looking in the direction of arrow 2, Fig. 1.
Figure 5:
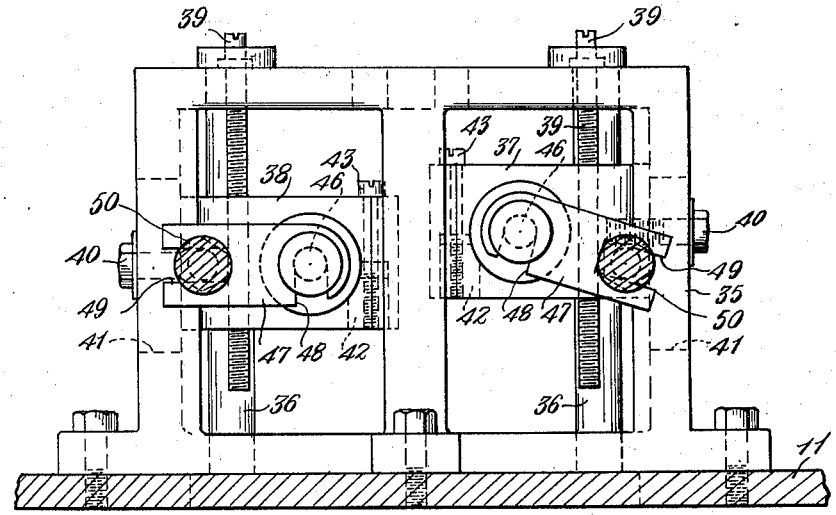
Fig. 5 is a vertical section taken substantially on the line 5—5 of Fig. 3, illustrating particularly the adjustability of the guides through which the bushings are projected into the cover.
Figure 6:
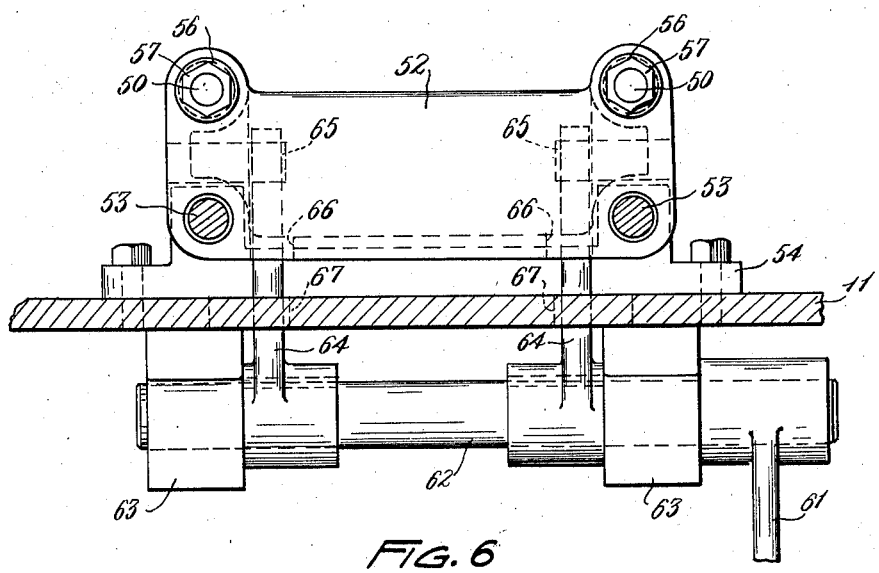
Fig. 6 is a vertical sectional view taken substantially on the line 6—6 of Fig. 3, illustrating a part of the mechanism for reciprocating the plungers that are employed for pushing bushings into place.

Now, with respect to the means employed for handling the covers 29, as previously stated they are fed downwardly in the cover chute which consists primarily of grooved bars 30 that receive the bottom flanges of the covers. The covers have been omitted from Fig. 2 for the sake of clearness in the illustration, but it will be observed in Figs. 1 and 3 that while the flanges of adjacent covers come together in the grooves of the chute, the body portions of the covers are so inclined that on that side of the column or stack there is considerable space between adjacent covers. On the upper frame there is mounted, preferably by means of adjustable brackets 102, (Fig. 2) a rock shaft 103 having a pair of fingers 104 fixed thereupon, these fingers being adapted to engage beneath a cover as shown in Fig. 4. A small crank 105 is fastened to the shaft 103 and is connected at its upper end to a link 106. At its rear extremity this link is provided with a slot 107 which receives a pin 108 that is mounted in spaced parallel elements of a moving upright 109 through which the link 106 extends. A tension spring 110 is attached to one end of pin 108 and to the pivot between the link 106 and crank 105. When the upright 109 moves inwardly the pin 108 engages the end of slot 107 and positively retracts the fingers 104, bringing them into the position of Fig. 1. When the upright 109 moves outwardly however, the spring 106 exerts a pull on the upper end of crank 105 tending to advance the fingers 104 to the operative position shown in Fig. 4. At this time, should there be anything in the way to prevent the fingers 104 from advancing, the spring 110 would merely be put under further tension, thus avoiding breakage of parts.

Lower down on the frame there is mounted a second rock shaft 111 upon which are fixed fingers 112 adapted to support a cover. Centrally of this shaft there is a crank 113 to which is pivotally connected a link 114 that is connected with the upright 109 by a pin 115 and slot 116. A disk 117 is fixed upon shaft 111 near one end thereof. In the periphery of this disk there are two notches 118, each of which is adapted to be engaged at different times with a spring detent 119. When the upright 109 moves rearwardly from its position of Fig. 3, the pin 115 at first moves in the slot 116 without affecting the fingers 112. As soon as the pin 115 engages the outer end of slot 116 however the link 114 is pulled rearwardly, the fingers 112 are retracted to the position of Fig. 4, and the disk 117 is rotated to disengage the detent 119 from one notch 118 and to cause it to engage the other notch 118. The upright 109 is preferably made as an integral part of a bracket 120 which is secured to a transverse bar 121.

The bar 121 forms part of a slide which also comprises end blocks 122 that are bored to fit supporting and guiding rods 123 mounted at one end in a bracket 124 and at the other end in transverse frame 35. Each of the bars 31 has a hub portion 125 which is also bored to receive and slide upon one of the rods 123. Two rods 126 are secured to each bar 31, these rods preferably having reduced ends which extends through suitable openings in the bar and receive nuts 127. These rods 126 extend rearwardly through and slide in holes provided in the slide 121, and have headed rear ends to limit the separation of the slide 121 and bars 31. A coil spring 128 surrounds each rod 126 and tends to hold the bars 31 forward to as great an extent as the heads on the rods will permit. When the slide 121 moves forward or inward toward the center of the machine, the bars 31 are moved forward through the intermediacy of the four springs 128. When the slide 121 moves rearwardly bars 31 are drawn rearwardly by the bolts 126.

In connection with the slide 121 we also provide means for backing the somewhat fragile covers at the points where the greatest strain is encountered, namely at the bushing sockets. To this end double bosses or hubs 129 are provided, preferably integral with the slide 121, in which are slidably mounted plungers 130 that are hollow except for their front end portions. At their front ends the plungers 120 carry vertical bars 131 that are of sufficient width to adequately engage the post hole bosses on the covers and of sufficient length to engage these bosses regardless of the amount of offset of the holes from the longitudinal center line of the cover. Near its rear end each of the plungers 130 has a pair of transversely aligned slots 132 in its opposite walls. A pin 133 extends through these slots and is anchored at both ends in the hub 129. A compression spring 134 is mounted in the bore of the hollow plunger 130 and is compressed against the pin 133. The plunger 130 normally remains in the position illustrated in Fig. 7, that is with respect to the boss 129. The spring 134 tends to move the plunger toward the right, but its movement is prevented by the pin 133 engaging the rear end of slot 132. Hence the plunger moves with the slide in both directions, but in the event that there should be something to obstruct the advancing movement of the plunger, the spring 134 would yield, thereby preventing damage to the machine or to the cover 29 then in the machine.

The slide 121 is caused to reciprocate by means of a pair of arms 135 fixed at their lower ends to a rock shaft 136 which is mounted in bearing brackets 137 bolted to the lower side of the top 11 of the underframe. The arms 135 extend through slots 138 in the top 11, and at their upper ends are provided with outwardly extending cylindrical projections 139 which run in vertical grooves 140 in the blocks 122. Keyed to the shaft 136 near one end of the latter there is a downwardly extending lever 141 upon the lower extremity of which is a cam follower 142 which under the influence of a tension spring 8 runs upon a cam 143 that is keyed to the cam shaft 19.

Flush with the upper ends of each of the bars 31 there are lands 145 extending longitudinally of the machine, the function of these lands being to catch the covers 29 when they are released from the chute and to support them until the holder, which consists primarily of the grooved bars 31, comes into position directly beneath the chute so that the bottom flanges of the cover may enter the grooves of the bars 31.

Operation. In the principal figures of the drawings we have illustrated the machine parts in the positions they occupy immediately after bushings have been pushed into the sockets of the covers 29. At this time the slides 52 and 121 are in their innermost positions, and the high points of the cams 59 and 143 are in engagement with the followers 60 and 142, respectively. In the next one-quarter revolution of the cam shaft the slide 52 is withdrawn, or moved to the right, about half way, while the slide 121 is withdrawn, or moved to the left, as far as it goes in that direction. The first part of the rearward movement of the slide 121, that is the movement which occurs before the slide engages the heads of the rods 126, serves to separate the bars 131 from the cover, thereby releasing the cover from the action of those bars. As the rearward movement continues the slide pulls the cover holder to the left far enough so that the bottom flange on the cover is pulled off the supporting table 32 and the cover drops out of the holder, through the opening 33' in the top 11, and out by way of chute 34' or other cover discharging means. During this rearward movement the upright 109 moves rearwardly causing the spring 110 to pull the fingers 104 into position between the two lower covers in the chute, as indicated in Fig. 4. A trifle later it also pulls on link 114, retracting the fingers 112 and dropping the lowermost cover part way out of the chute down onto the lands 145.

The next quarter revolution of the cam shaft carries the cover holder part way forward or until it comes directly underneath the cover chute, that is with the grooves of bars 31 in vertical alignment with the grooves of bars 30. The partly lowered cover then drops entirely out of the chute and into the cover holder ready for the next operation. This second quarter revolution of the shaft also pulls the slide 52 back to the right to the extreme of its motion. At this stage the plungers 44 and 45 are withdrawn somewhat beyond the bushing chutes 25 and 26, and the lowermost bushings in each chute then descend by gravity into the guide sleeves 27 and 28, that is into the large diameter bore portions of those sleeves which are indicated at 68 in the drawings.

At about the beginning of the third quarter of the cam shaft revolution the cover holder moves a short distance further to the right into the position indicated in the drawings. By this movement the annular bosses 74 and 75 on the cover are brought up into contact with the ends of the guide sleeves 27 and 28. This movement also causes pin 115 to shift link 114 to the right, thereby placing fingers 112 in position to support the column of covers in the chute 30, and the column is lowered by the withdrawal of fingers 104 through the movement of link 106 to the right. At the same time the slide 52 begins its travel toward the left, and the two bushings in the guide sleeves are moved into the tapered portions of the bores of those sleeves, compressing the bushings radially inward and centering them. The stacks of bushings in the chutes are supported during this time by the plungers.

During the fourth quarter revolution the cover holder remains fixed while the plungers 44 and 45 continue their movement toward the left, pushing the compressed bushings into the sockets. This completes the cycle.

In the foregoing description we have necessarily gone somewhat into detail in order to explain fully the particular embodiments of the invention herein illustrated, but we desire it to be understood that such detailed disclosures are not to be construed as amounting to limitations, except as they may be included in the appended claims.

Having thus described our invention, we claim:

1. In a machine of the class described, a cell cover chute and a bushing chute, a guide sleeve with an opening in its side for receiving the lowermost bushing from the chute, a holder for a cover, means for releasing one cover at a time from the bottom of said cover chute, means for moving said holder horizontally into position to take a released cover, and means for moving the cover and bushing relatively toward each other for pressing the bushing into a socket of the cover.

2. In a machine for inserting bushings into sockets of cell covers, means for delivering and positioning a cover and a pair of resilient bushings with the axes of the bushings in alignment with the bushing sockets in the cover, means moving into position after delivery of the cell cover to resiliently clamp the same and to provide a backing for the sockets, means for compressing the said bushings radially inward, and means for moving the compressed bushings and cover relatively toward each other until the bushings are pressed into the sockets.

3. In a machine for inserting bushings into sockets of cell covers, means for delivering and positioning a cover and a pair of bushings with the axes of the bushings in alignment with bushing sockets in the cover, said means being adjustable to vary the positions of the said axes in the machine, whereby covers with bushing sockets centered or off-center may be accommodated, and means for pushing the two bushings into the cover sockets.

4. In a machine of the class described, a chute for cell covers, a holder for a cell cover adapted to receive one cover at a time from said chute and hold it in a predetermined position, a tubular bushing guide in alignment with a socket in the cover when so held, means for placing one bushing at a time in said guide, a plunger for advancing the bushing in said guide and pushing it out of the guide into said socket, said guide having an inner tapered wall by means of which the bushing is radially compressed before it enters said socket, and means for yieldably clamping the cover and backing the said socket.

5. In a machine of the class described, a holder for a cell cover adapted to support a cover in a vertical plane at a definite predetermined position, means for placing one cover at a time in said holder, a pair of horizontal tubular bushing guides spaced lengthwise of the cover to correspond with the longitudinal spacing of the cover sockets, means for adjusting one of said guides up and down to align it with the corresponding socket in the cover, means for placing one bushing at a time in each of said guides, a plunger movable in each of said guides for advancing the corresponding bushing and pushing it out of the guide into the corresponding socket, and means for driving said plungers operable in all positions of adjustment of said adjustable guide.

6. In a machine of the class described, a table, a holder open at the top and bottom and adapted to receive and hold on edge a cell cover provided with bushing sockets with the lower edge of the cover resting on the table, means operating in the normal position of the holder for placing a cover therein, means for moving the holder over the table from said normal position to a forward operating position, means for pushing bushings into the cover sockets when the cover is in said forward position, and means for retracting the holder to a position to the rear of said table, whereupon the cover is free to drop and be discharged from the machine.

7. In a machine of the class described, a frame, a block vertically adjustable in said frame, a guide sleeve mounted in said block, a plunger slidable in said sleeve, a rod mounted to reciprocate in a fixed path parallel to the axis of the plunger, and means for connecting said rod and plunger against relative movement longitudinally while permitting adjustment of the block vertically.

8. In a machine of the class described, a guide sleeve, said sleeve having a lateral opening therethrough by means of which a bushing may be inserted into the sleeve, the bore of the sleeve at said opening being enlarged and the bore in advance of the said opening being tapered, means for holding a cell cover with the wall of its bushing socket engaging the end of said sleeve, a plunger slidable in said sleeve, and means for moving the plunger forward to push the bushing through said tapered bore and out of the sleeve into the socket.

9. In a machine of the class described, a guide sleeve, said sleeve having a lateral opening therethrough by means of which a bushing may be inserted into the sleeve, the bore of the sleeve at said opening being enlarged and the bore in advance of said opening being tapered, a holder for a cell cover, the cover having a bushing socket therein aligned with said sleeve, means for advancing the holder toward the sleeve until the cover therein comes into engagement with the forward end of the sleeve, a plunger slidable in said sleeve and means for moving the plunger forward toward the cover to push the bushing through said tapered bore and out of the sleeve into the socket.

10. In a machine of the class described, a holder for cell covers provided with bushing sockets, said holder being adapted to receive cell covers from above and holding them on edge, a pair of reciprocating plungers for pushing bushings into the sockets of the cover while it is in position in said holder, a cover chute above the holder, and an escapement mechanism for lowering the bottom cover in the chute into said holder while supporting the remainder of the column of covers.

11. In a machine of the class described, a vertically adjustable table, a cell cover holder located above said table for supporting a cell cover in a vertical plane, means for placing cell covers one at a time in said holder with their lower edges resting upon the table, horizontal bushing guides arranged at right angles to a cover when mounted in said holder, plungers movable in said guides for pushing bushings into the sockets of the covers, means for moving one of said guides up and down for vertical adjustment relative to the other guide, and means for driving said plungers operative in the various positions of adjustment of said movable guide.

12. In a machine for inserting bushings in covers provided with bushing sockets, a carrier for covers on edge comprising a holder adapted to engage the bottom flange of the cover, means for moving the carrier forward to operative position against stops, backing bars on the carrier adapted to engage the cover behind its sockets, said backing bars moving into engagement with the cover after the forward movement of the latter has stopped, and means for inserting bushings in the cover sockets, said backing bars moving out of engagement with the cover immediately preceding the rearward movement of the cover after the insertion of bushings.

13. In a machine for inserting bushings into sockets of cell covers, means for delivering a cell cover and a pair of resilient bushings into position with the axes of the bushings in alignment with the bushing sockets in the cover, means moving into position after delivery of the cell cover to resiliently clamp the same in the vicinity of the bushing sockets and to provide backing for the sockets, and means for moving the two bushings and cover resiliently toward each other in a single operation until the bushings are pressed into the sockets.

14. In a machine for inserting bushings into sockets of cell covers, means for delivering a cell cover and a pair of resilient bushings into position with the axes of the bushings in alignment with the bushing sockets in the cover, means moving into position after delivery of the cell cover to resiliently clamp the same in the vicinity of the bushing sockets and to provide backing for the sockets, and means for pushing the two bushings simultaneously into the cover sockets, said last named means being applicable to bushings of the same or different sizes.

15. In a machine of the class described, a table, an open bottom holder for a cell cover adapted to support a cover on edge on the table in a definite predetermined position, means for placing one cover at a time in said holder, means for moving the holder forward into operative position, mechanical means for compressing the bushings and placing them in position in the cover sockets, means for retracting the holder to a position to the rear of said table, and a delivery chute for the reception of the covers from the holder in said last named position thereof.

ALEXANDER H. B. JEFFORDS.
HENRY P. CAMP.